No. 607,380. Patented July 12, 1898.
N. KAUFFMANN.
CATCH BASKET FOR LAWN MOWERS.
(Application filed Oct. 4, 1897.)
(No Model.) 2 Sheets—Sheet 1.

Attest
L. Bieber
H. C. Reche

Inventor
Nickolas Kauffmann
by
M. M. Cadz Atty.

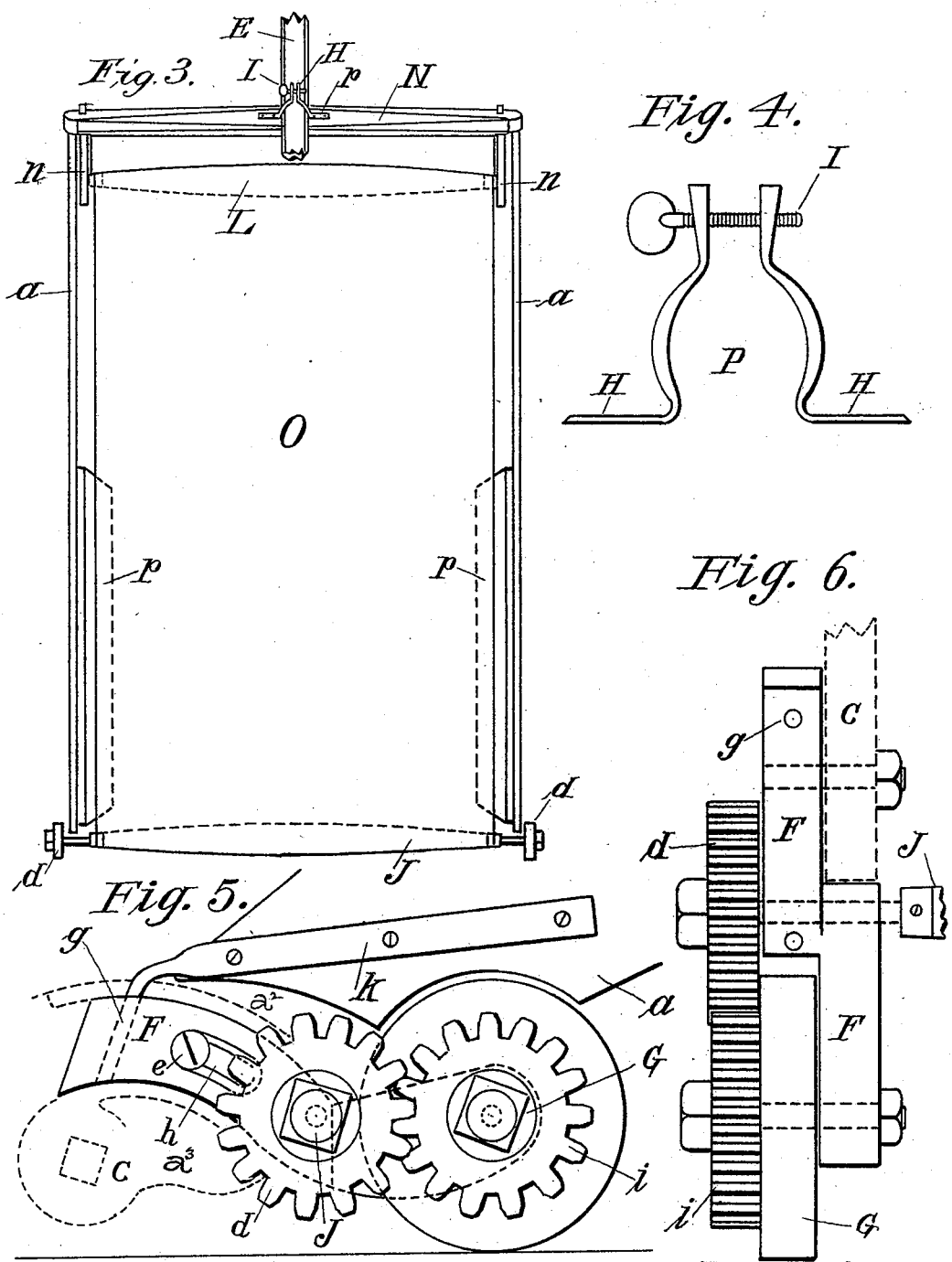

UNITED STATES PATENT OFFICE.

NICKOLAS KAUFFMANN, OF DUBUQUE, IOWA.

CATCH-BASKET FOR LAWN-MOWERS.

SPECIFICATION forming part of Letters Patent No. 607,380, dated July 12, 1898.

Application filed October 4, 1897. Serial No. 654,071. (No model.)

*To all whom it may concern:*

Be it known that I, NICKOLAS KAUFFMANN, a citizen of the United States, residing at Dubuque, in the county of Dubuque and State of Iowa, have invented certain new and useful Improvements in Catch-Baskets for Lawn-Mowers; and I do hereby declare the following to be a full, clear, and exact description of the invention, such as will enable others skilled in the art to which it appertains to make and use the same.

The leading thought of my invention is to provide a cheap and convenient catch basket or box for collecting the grass cut by lawn-mowers and also ready means for removably attaching the same without extra appliances or changes in the construction of the mower.

It essentially consists, among other things, in a catch-basket in which is caused to travel an endless apron, with means for operating said apron and for dumping the basket when filled; also in means for adjusting the tension of the apron, and, further, it consists in means for removably attaching the whole to a lawn-mower provided with a roller.

In order that a better understanding of the device and its workings may be had, an explanation in detail, with the drawings accompanying the same, is herewith submitted.

Figure 1:
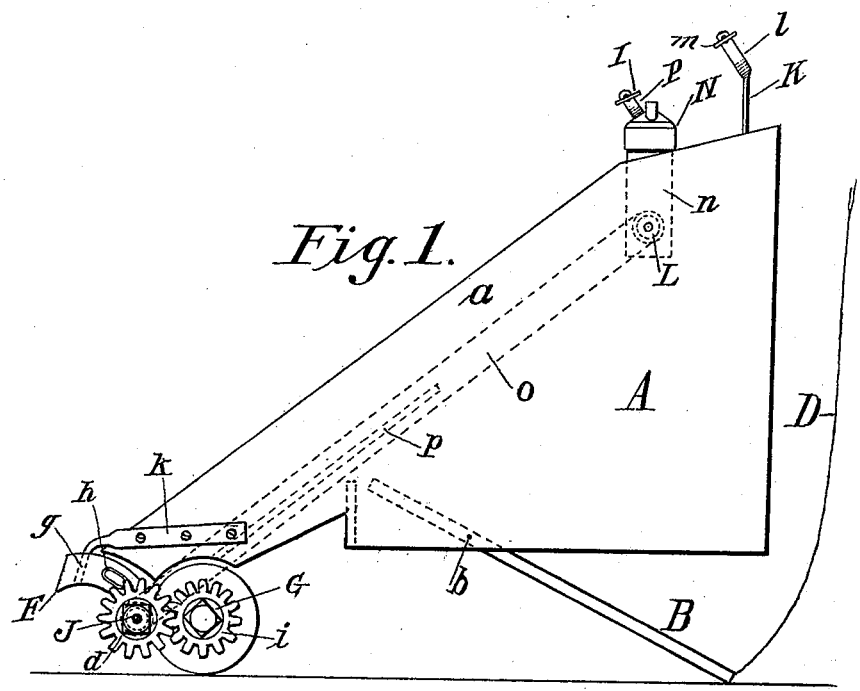
Figure 2:
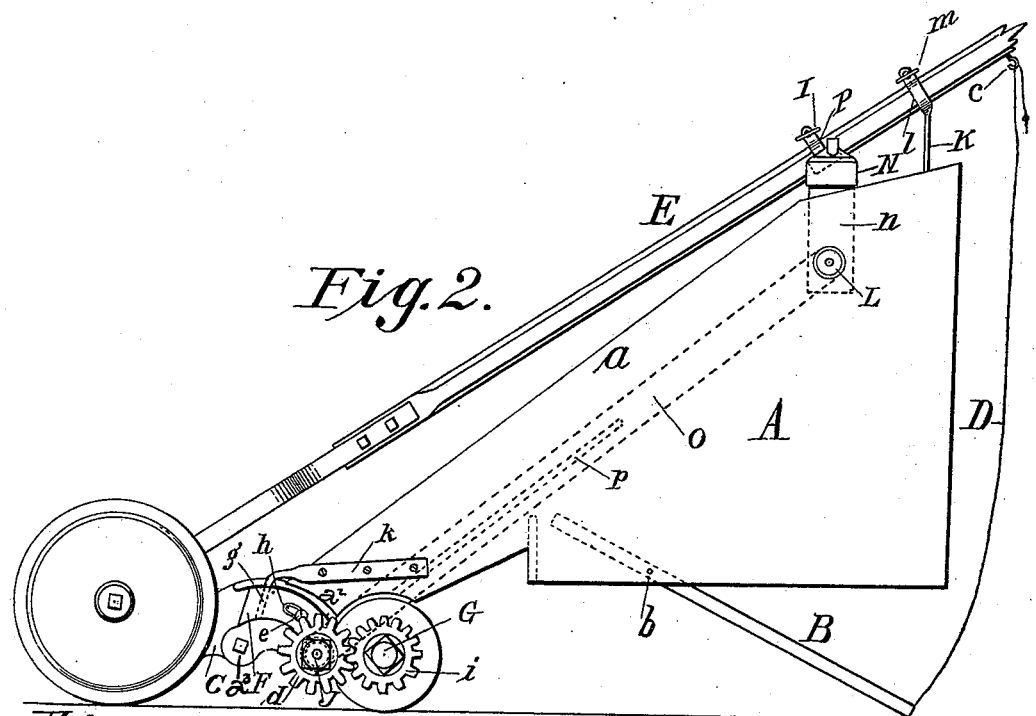

In the drawings, Figure 1 is a side view of my device detached from the mower. Fig. 2 shows a side view of my device attached to the mower. Fig. 3 is a plan view of the endless apron and its adjusting device. Fig. 4 is a side elevation of the clasp for adjusting the tension of the apron. Fig. 5 is a side elevation of the gear for running the apron and of the appliances for removably attaching the whole to the mower. Fig. 6 is a plan view of one edge of the gear and side of the basket.

Like letters of reference denote corresponding parts in all of the drawings.

Referring to the drawings, the catch-basket is designated by A and consists of two triangular side pieces $a$. The bottom B of this basket is pivoted, one side of its center, to the sides of the basket by the pivot-pins $b$, and to the outer ends of the bottom B is attached a cord D, which extends up and is removably caught into a hook $c$, suspended from the handle E of the mowing-machine.

For removably securing this basket to lawn-mowers in which there is a roller following the cutters and a plate C, in which the roller is pivoted, there is adjustably secured to said plate C another plate F by the set-screw $e$. The plate F is adjustable back and forth upon the plate C between the flange $a^2$ on the upper edge of the plate C and the guiding-piece $a^3$, which is clamped to the side of the plate, as shown. The plate F is provided with a slot $h$, through which a set-screw $e$ adjustably secures the plate F to the plate C. There is also pivoted in this plate F a roller J, having upon its outer end a gear-wheel $d$, and another roller G, having a gear-wheel $i$, which meshes into the gear $d$ and turns the same. In the plate F is also a hole $g$. To each opposite side of the basket A, at its forward end, is secured a plate $k$, bent downward at its forward end and adapted to engage in said hole $g$ in the plate F for the purposes presently to appear. To the rear end of the box is attached a hanger K, which extends upward and is divided near its top, forming a clasp $l$, similar to that shown in Fig. 4, having thereon a screw $m$. This clasp is adapted to surround the handle E of the lawn-mower, and the screw $m$ will draw the two parts of the clasp firmly upon the handle E and sustain the rear end of the basket.

Across the top of the basket A, near the rear, runs a bar N, to which are fastened two hangers $n$. Upon the top of this bar N is secured a clasp P (shown in Fig. 4) by screws through its arms H. This is also supplied with a screw I. In the lower end of these hangers is pivoted a roller L, and around this roller and the roller J travels the endless apron O. For the purpose of keeping the cut grass from falling over the sides of the apron O and to prevent the apron from sagging as it travels upward, and with it the grass, there are fastened in each of the side pieces $a$ guides $p$.

The manner of attaching and detaching this catch-basket to a mower and its mode of operation when attached are substantially as follows: The roller upon the lawn-mower hung in the plate C is first removed from the plate C. The plate F, in which is pivoted the two rollers G and J, is then fastened to the plate C by the screw $e$ and adjusted in the slot $h$ until said rollers are in the proper position to the cutters of the mower. The bent points of the bars *k* are inserted in the holes *g* in the plate F. This construction firmly holds the basket and the apron O in the proper position for gathering the grass as it is cut by the cutters of the machine. The hanger K, which is secured to the rear of the basket, is then clasped around the handle E and securely held by the screw *m*. The cord D is then drawn up and caught in the hook *c*, bringing with it the bottom B of the basket into a horizontal position and closing the opening. For the purpose of keeping the apron O sufficiently taut the bar N is raised, carrying with it the roller L, pivoted in the hangers *n*, thereby stretching the apron O. When it is thus stretched, the clasp P is set to engage around the handle E, and the set-screw I will draw the clasp firmly upon the handle, holding it in the given position and the apron taut. If the apron becomes damp and stretched too tightly, the clasp P may be loosened, and in this manner the apron O also will be loosened. It will be seen by this mode of construction that the catch-basket may be attached to the mower by simply the use of the two screws *e* and the screws *m* and the apron adjusted by the screws I of the clasp P, which requires a very short space of time to accomplish, and it may be as readily removed by loosening these same screws. When the box is properly adjusted to the mower, the operator cuts the grass in the usual manner, and as it is cut the grass will fall back upon the endless apron and be carried up over the roller L and dumped into the basket A. When the basket A is full, the operator moves his machine to a given place in the yard and unloosens the cord D from the hook *c* and the weight of the grass upon the rear end of the bottom B opens the bottom of the box and the contents are emptied.

This attachment is intended more especially for those lawn-mowers which are provided with rollers. While the invention can be attached to any lawn-mower which has a plate on each side to which the cutter-knife is secured, if there is no roller there is no hole in the plate into which the screw *e* can be inserted, and hence it will be necessary to drill a hole through this plate. All lawn-mowers having a roller are provided with an opening into which the screw is inserted, and hence my attachment is readily applied.

Having now described my invention and its mode of operation, what I claim is—

1. A lawn-mower, a detachable catch-basket suspended at its upper end from the handle, and provided with an extension at its lower end that extends beyond the lower roller for the apron, combined with a roller that is journaled in the plates attached to the opposite sides of the mower, an upper roller, an endless apron which passes around the rollers, suitable hangers for the upper roller supported by the handle, and means for securing the lower end of the basket in position, substantially as shown.

2. As an attachment for a lawn-mower, the plate C, the slotted plates F adjustable upon the plates C, the lower roller J provided with a gear *d*, the roller provided with a gear *i*, and which meshes with the one *d*, combined with the catch-basket having a pivoted bottom, the upper roller L, the endless apron, hangers provided for the upper roller and which are suspended from the handle, a suitable fastening device for attaching the rear end of the basket to the handle, and suitable means for connecting the front end of the basket to the plates F, substantially as set forth.

3. In combination with a lawn-mower, a basket A, having a bottom B, pivoted to said basket, cord D, hanger K, with clasp *l*, and screw *m*, an endless apron traveling around the rollers J, and L, plate F, carrying the rollers J, and G, and plate *k*, adapted to engage plate F, for removably attaching the same to the mower, as, and for the purposes shown.

In testimony whereof I affix my signature in the presence of two witnesses.

NICKOLAS KAUFFMANN.

Witnesses:
M. M. CADY,
L. BIEBER.